US009708461B2

(12) United States Patent
Burlett

(10) Patent No.: US 9,708,461 B2
(45) Date of Patent: Jul. 18, 2017

(54) METHOD FOR RUBBER REINFORCED WITH CARBON NANOTUBES

(71) Applicant: THE GATES CORPORATION, Denver, CO (US)

(72) Inventor: Donald J Burlett, Oxford, MI (US)

(73) Assignee: Gates Corporation, Denver, CO (US)

(*) Notice: Subject to any disclaimer, the term of this patent is extended or adjusted under 35 U.S.C. 154(b) by 653 days.

(21) Appl. No.: 14/243,634

(22) Filed: Apr. 2, 2014

(65) Prior Publication Data

US 2015/0284532 A1 Oct. 8, 2015

(51) Int. Cl.
| | | |
|---|---|---|
| *C08K 5/01* | (2006.01) | |
| *C08K 3/04* | (2006.01) | |
| *C08K 5/05* | (2006.01) | |
| *C08K 5/09* | (2006.01) | |
| *C08K 5/098* | (2006.01) | |
| *C08K 5/101* | (2006.01) | |
| *C08K 5/103* | (2006.01) | |
| *C08K 5/20* | (2006.01) | |
| *C08K 7/24* | (2006.01) | |
| *C08L 91/06* | (2006.01) | |

(52) U.S. Cl.
CPC .............. *C08K 5/01* (2013.01); *C08K 3/04* (2013.01); *C08K 5/05* (2013.01); *C08K 5/09* (2013.01); *C08K 5/098* (2013.01); *C08K 5/101* (2013.01); *C08K 5/103* (2013.01); *C08K 5/20* (2013.01); *C08K 7/24* (2013.01); *C08L 91/06* (2013.01); *Y10T 428/139* (2015.01)

(58) Field of Classification Search
CPC ... C08K 5/01; C08K 3/04; C08K 5/05; C08K 5/09; C08K 5/098; C08K 5/101; C08K 5/103; C08K 5/20; C08K 7/24; C08L 91/06; Y10T 428/139
See application file for complete search history.

(56) References Cited

U.S. PATENT DOCUMENTS

| | | | |
|---|---|---|---|
| 7,785,701 | B2 | 8/2010 | Noguchi et al. |
| 2006/0062986 | A1 | 3/2006 | Magario et al. |
| 2007/0112124 | A1 | 5/2007 | Noguchi et al. |
| 2008/0191176 | A1 | 8/2008 | Tobori et al. |
| 2009/0256119 | A1 | 10/2009 | Bastiaens et al. |
| 2010/0009160 | A1 | 1/2010 | Noguchi et al. |

(Continued)

FOREIGN PATENT DOCUMENTS

| | | |
|---|---|---|
| EP | 2138535 B1 | 12/2011 |
| WO | 2014032172 A1 | 3/2014 |

OTHER PUBLICATIONS

European Patent Office, international Search Report application No. PCT/US2015/022372, Mailing date Jun. 18, 2015.

*Primary Examiner* — Michael C Miggins
(74) *Attorney, Agent, or Firm* — Paul N. Dunlap, Esq.; Jeffrey A. Thurnau, Esq.

(57) ABSTRACT

A method for preparing a "predispersion" of carbon nanotubes in a wax or wax blend involving melt-mixing, cooling and grinding the blend, preferably multiple times. The wax predispersion may provide particularly improved dispersion of single-wall nanotubes in ethylene-α-olefin elastomer compositions, resulting in improved reinforcement from the SWCNT. The improved elastomer compositions may show simultaneous improvement in both modulus and in elongation at break. The inventive elastomer compositions may be formed into useful rubber articles.

21 Claims, 1 Drawing Sheet

(56) References Cited

U.S. PATENT DOCUMENTS

| | | |
|---|---|---|
| 2010/0009183 A1 | 1/2010 | Noguchi et al. |
| 2011/0193030 A1 | 8/2011 | Kolditz et al. |
| 2012/0040176 A1 | 2/2012 | Noguchi et al. |
| 2012/0164448 A1 | 6/2012 | Yu et al. |
| 2012/0241686 A1 | 9/2012 | Bastiaens et al. |
| 2012/0309887 A1 | 12/2012 | Noguchi et al. |
| 2013/0012644 A1 | 1/2013 | Niihara et al. |

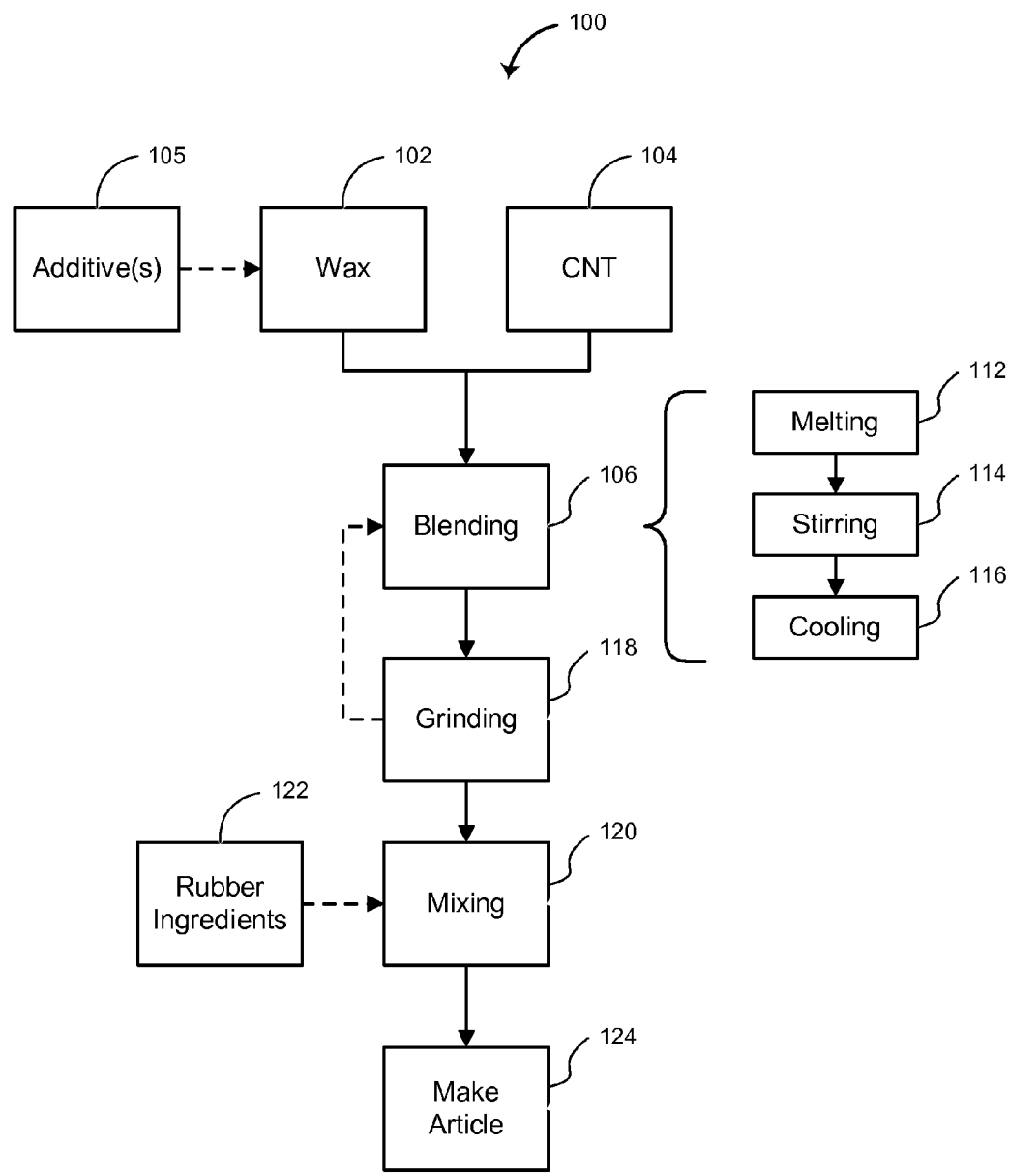

METHOD FOR RUBBER REINFORCED WITH CARBON NANOTUBES

BACKGROUND OF THE INVENTION

1. Field of the Invention

This invention relates generally to methods of dispersing carbon nanotubes in elastomers, the resulting elastomer compositions, and the articles made from the resulting elastomer compositions.

2. Description of the Prior Art

Because carbon nanotubes ("CNT") are produced as entangled bundles of fibers, getting them to disperse in a polymer is a critical step in their utilization as reinforcing additives. A number of approaches have been used to obtain polymers with dispersed carbon nanotubes. Among these methods are melt blending of CNT into thermoplastic resins, polymerization in the presence of the CNT, high shear mixing, chemical modification of the CNT, and the use of surfactants.

Regarding mixing carbon nanotubes into rubber or elastomeric polymers, it is very difficult to disperse the CNT in a matrix material with as high a viscosity as most elastomers or rubbers have. The application of heat does not reduce the viscosity of the polymer significantly enough as it does in melt-blending into plastics. What is needed is a method to improve the dispersibility of the CNT in rubber.

U.S. Pat. Appl. Pub. No. 2012/0241686 A1 discloses an electrically conductive thermoplastic composition prepared by melt blending a thermoplastic polymer and a masterbatch of carbon nanotubes in wax having a melting point of about 45 to about 150° C. Use of the master batch of carbon nanotubes in wax also improves the melt flow properties of the electrically conductive thermoplastic composition. No mention is made of elastomer compositions.

U.S. Pat. No. 7,785,701 B2 discloses a carbon fiber composite material comprising an elastomer and a carbon nanofiber dispersed in the elastomer, wherein the elastomer has an unsaturated bond or a group, having affinity to the carbon nanofiber. When the affinity of the elastomer for the nanofiber is high, the dispersion is reportedly easy by the shear force of mixing, e.g. on an open roll mill. Dispersion is reportedly not so easy for nonpolar elastomers such as EPDM. The resulting mill-mixed compositions show an increase in modulus and strength but a decrease in elongation as is typical of many reinforcing fillers, relative to the composition without nanofiber.

EP 2,138,535 B1 discloses a vulcanizable composition containing a specific hydrogenated carboxylated nitrile rubber (HXNBR), a cross-linking agent and carbon nanotubes and a process for preparing such compositions. It is reported therein that solvent mixing, melt mixing and the spray drying process have been employed as processing methods to prepare some rubber/CNT composites. The examples of MWCNTs in HXNBR were conventionally mixed in an internal mixer and two-roll mill. The resulting compositions showed an increase in modulus and strength but essentially the same elongation.

SUMMARY

The present invention is directed to improved methods of dispersing carbon nanotubes in elastomers and the resulting elastomer compositions and articles made therefrom.

The use of a wax or wax blend (such as paraffin wax and petrolatum, or other controlled blend of hydrocarbon waxes) has been found to be useful for preparing a "predispersion" of CNT that assists in the dispersion of the CNT in elastomers during mixing of elastomer or rubber compositions. The method of preparation of the CNT predispersion involves melt-mixing, i.e., mixing while the wax is melted and grinding when the wax is frozen. The CNT concentration in the predispersion or blend may be up to 20, 30 or even 50% by weight. The mixing and grinding process may advantageously be repeated, for example, twice, thrice, or more, or four to six times. A wax predispersion may provide particularly improved dispersion of SWCNT in an EPDM composition, resulting in improved reinforcement from the SWCNT.

The improved elastomer compositions containing some amount of the CNT predispersion may show simultaneous improvement in both modulus and in elongation at break on the order of 25%, 30% or 50% or more. The compositions may also show improvements in tear strength, cut or crack growth rates and fatigue resistance. The amount of CNT in the elastomer compositions of the invention may be from 0.5 to 5 weight %. The inventive elastomer compositions may be formed into useful rubber articles, such as tires, belts, hose, or vibration control components.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is a flow chart of an embodiment of the inventive method.

DETAILED DESCRIPTION

The methods and elastomer compositions according to the invention comprise a predispersion of CNT dispersed in a wax. A predispersion is a mixture of materials made in advance of another mixing process, e.g. a rubber composition mixing process. The predispersion is accordingly mixed into an elastomer together with other desired ingredients to make an elastomer composition suitable for molding useful elastomeric articles. FIG. 1 shows a flow chart of the method according to an embodiment of the invention. Predispersions are also referred to as preblends or simply "blends."

In FIG. 1, method 100 includes the steps of blending 106, grinding 118, mixing 120, and making an article 124. The blending step 106 includes as inputs a wax 102, carbon nanotubes 104, and optionally other additives 105. The blending step may include melting 112, stirring 114, and cooling 116. Another such blending step 106 may be repeated after grinding 118. The blending/grinding sequence may be repeated any suitable number of times. After the final grinding or blending step, the resulting predispersion may be introduced into mixing step 120 along with desired rubber ingredients 122 to obtain a rubber compound suitable for making article 124. Mixing step 120 may optionally include multiple mixing process steps and/or multiple ingredient additions.

The carbon nanotubes (CNT) are very strong molecular fibers with small dimensions across the fiber and reasonably large L/D ratios. Several synthetic methods are possible, with chemical vapor deposition (CVD) and electric arc discharge (EAD) among the more common methods used. The dimensions depend on the manufacturing process. Single-walled carbon nanotubes (SWCNT) may range from 0.5 to 6 nanometers (nm) in diameter have lengths ranging from 0.1 to 5 microns (μm) in length, preferably 0.5 to 5 μm in length. A single-wall carbon nanotube is formed from a single graphene sheet folded into a cylinder. Multi-walled carbon nanotubes (MWCNT) range from 2 to 110 nm in diameter and from 0.1 to 1000 μm, preferably from 0.1 to 50 μm in length, and consist of multiple layers of graphene rolled up on themselves to form a tube shape. These dimensional variations depend on the process and manufacturer. Either single-wall carbon nanotubes or multi-wall carbon nanotubes may be used in the inventive methods and compositions, but single-wall carbon nanotubes are preferred.

The terms rubber and elastomer may be used somewhat interchangeably, but rubber generally implies a crosslinked elastomer material, while some elastomers may in general be thermoplastic or may be crosslinked. The terms "rubber" and "elastomer" are used herein to refer to the elastomeric or rubbery polymer which forms a primary elastomeric constituent of an elastomeric or rubbery material, while the terms "rubber composition" and "elastomer composition" are used to refer to a mixture of a primary elastomeric constituent with one or more other compounding ingredients, such as fillers, fibers, antidegradants, curatives, cure accelerators, coagents, softeners, extenders, and the like. Any suitable elastomer may be used, including without limit, natural rubber (NR), epoxidized natural rubber (ENR), isoprene rubber (IR), styrene-butadiene rubber (SBR), nitrile rubber (NBR), hydrogenated nitrile (HNBR), chloroprene rubber (CR), ethylene-α-olefin elastomers such as ethylene propylene rubber (EPM or EPDM), ethylene butene (EBM) or ethylene octene (EOM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (ECO), cast urethane elastomers (PU), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS), and the like. A mixture of these elastomers may be used. Embodiments of the method are particularly useful for ethylene-α-olefin elastomers including difficult-to-disperse, non-polar elastomers such as EPM or EPDM, EBM, or EOM.

The carbon nanotube predispersion comprises carbon nanotubes and a wax. As used herein, the term "wax" refers to a substance that is a pliable solid at 25° C. and one atmosphere. The wax may have a melting point of about 45 to about 150° C. Within this range, the melting point can be about 50 to about 130° C., or about 55 to about 110° C., or about 60 to about 90° C., or even about 60 to about 80° C., or about 60 to about 70° C.

Types of waxes suitable for use in the present method include fatty alcohols, fatty acids, fatty acid salts (also known as "soaps"), fatty acid amides, fatty acid esters, polyolefin waxes, paraffin waxes, and combinations thereof.

Specific fatty alcohols include, for example, cetyl alcohol (1-hexadecanol, melting point 49° C.), stearyl alcohol (1-octadecanol, melting point 60° C.), arachidyl alcohol (1-eicosanol, melting point 64° C.), behenyl alcohol (1-docosanol, melting point 71° C.), lignoceryl alcohol (1-tetracosanol, melting point 77° C.), ceryl alcohol (1-hexacosanol), montanyl alcohol (1-octacosanol, melting point 83° C.), myricyl alcohol (1-triacontanol, melting point 87° C.), geddyl alcohol (1-tetratriacontanol), and combinations thereof. [0010] Specific fatty acids include, for example, myristic acid (tetradecanoic acid, melting point 54.4 C.°), palmitic acid (hexadecanoic acid, melting point 63° C.), stearic acid (octadecanoic acid, melting point 70° C.), arachidic acid (eicosanoic acid, melting point 75.5° C.), behenic acid (docosanoic acid, melting point 80° C.), lignoceric acid (tetracosanoic acid, melting point 84° C.), cerotic acid (hexacosanoic acid), montanic acid (octacosanoic acid, melting point 91° C.), and combinations thereof.

Specific fatty acid salts include, for example, calcium laurate (melting point 150-170° C.), calcium stearate (melting point 145-155° C.), calcium montanate (melting point 147° C.), zinc stearate (melting point 120-130° C.), and combinations thereof. [0012] Specific fatty acid amides include, for example, lauramide (melting point 110° C.), myristamide, palmitamide, stearamide, arachidamide, behenamide, lignoceramide, cerotamide, montanamide, erucamide (melting point 76° C.), oleamide (melting point 102-104° C.), ethylene bis(lauramide) (melting point 95-105° C.), ethylene bis(stearamide) (melting point 144-146° C.), and combinations thereof.

Specific fatty acid esters include, for example, glycerol monostearate (melting point 58-59° C.), ethylene glycol montanate (melting point 79-85° C.), glycerol montanate (melting point 77-83° C.), pentaerythritol tetrastearate (melting point 60-66° C.), trimethylolpropane tristearate, sorbitan tristearate, and combinations thereof. In some embodiments, the wax comprises pentaerythritol tetrastearate.

Specific polyolefin waxes include, for example, polyethylene waxes, polar polyethylene waxes, polypropylene waxes, polar polypropylene waxes, and mixtures thereof. Polyethylene waxes are polyethylenes having number average molecular weights of about 1,000 to about 10,000. They may be produced either by thermal degradation of higher molecular weight polyethylenes or directly via polymerization of ethylene. Like polyethylene waxes, polypropylene waxes have number average molecular weights of about 1,000 to about 10,000. Polypropylene waxes may be produced by thermal degradation of polypropylene or by polymerization of propylene. Polar polyethylene waxes may be produced by oxidation of low molecular weight polyethylene in air. The oxidation produces alcohol, ketone, and carboxylic acid groups on the polyethylene. The polarity of the polyethylene wax can be characterized by an acid value, which is a measure of the carboxylic acid group content. In some embodiments, the acid value is about 10 to about 70, specifically about 15 to about 30. Polar polypropylene waxes may be produced by maleic anhydride grafting.

The amount of CNT in the predispersion may be up to about 50%, or up to 30%, or up to 20% by weight based on the weight of the predispersion.

In a preferred embodiment, the wax comprises a paraffin wax (or a blend of paraffin waxes) and petrolatum. The ratio of paraffin wax to petrolatum may be from about 4:1 to 99:1, or from 7:1 to 10:1, or about 9:1. The CNT may be readily dispersed in the wax according to the methods described herein, and the CNT/wax predispersion is very compatible with ethylene-α-olefin elastomers such as EPDM.

The method of making the CNT/wax predispersion is to first melt the wax and stir in the CNT at a temperature above the melting point of the wax. The mixing may be carried out in any suitable mixer, whether batch-wise or continuous, such as, for example, internal mixers, ribbon-blade batch mixers, high-shear batch mixers, single-screw extruders, and twin-screw extruders. The mixing temperature may be for example from about 10° C. to about 150° C. above the melt temperature of the wax or wax blend.

After mixing the CNT and wax, the mixture is cooled enough to harden the mixture enough for grinding. Herein the term "freeze" or "frozen" is used to indicate that the mixture is cooled sufficiently to grind. The term "grind" is used herein for any suitable process of breaking up material, and/or mechanically reducing the particle size without it immediately clumping or agglomerating, whether considered crushing, pulverizing, powdering, granulating, milling, or the like. Grinding of soft waxes may be carried out in any suitable equipment, including for example a blender, a water jacketed mill, a pulverizer, preferably with air-cooled classifier, a hammer mill or a cage mill. Some waxes can be ground by mixing with dry ice, for example with 15 to 50% dry ice, before grinding. Freezing or cooling may be carried out with any suitable equipment or method, including within the grinding equipment.

Advantageously, the above-described sequence of steps consisting of melting, mixing, freezing, and grinding, may be repeated more than once, twice or thrice as needed to assure complete dispersion of the CNT in the predispersion. For example, the steps may be repeated a total of 2 to 10 times, or 3 to 9 times, or preferably 4 to 6 times.

The predispersion may be added to an elastomer composition according to known methods of compounding rubber and elastomers. For example, the rubber and its various ingredients may be compounded with the predispersion using an internal batch mixer, a single-screw extruder, a twin-screw extruder, two-roll mill, or the like. The various ingredients may be added in stages, or all at once. Preferably, the compound is mixed in multiple stages if in a batch mixer. The mixing of the compound may advantageously carried out in at least one of the mixing stages at a temperature above the melting point of the wax in the predispersion.

Examples

In the following examples, a wax blend including paraffin wax(es) and petrolatum is used to prepare predispersions of CNT that subsequently assist in the dispersion of the CNT in EPDM. Single-walled carbon nanotubes (SWCNT) were provided by Nano-C, Inc. of Westwood, Mass. As for the dimensions of the SWCNT, the diameter ranges from 0.8 to 1.9 nm with a higher abundance between 0.8 and 1.3 nm. Regarding the SWCNT bundle length, it ranges from 0.4 to 2 micrometer, most abundant from 0.5 to 1 micrometer. The wax used in the dispersions was Sunproof® Junior-FT manufactured by Addivant USA, LLC. This wax is believed to be a blend of waxes with melting peaks at about 39° C. and 56° C. White petrolatum was used as purchased from Walmart, and it had a melting peak of about 24° C. All other ingredients mentioned herein were obtained from commercial distributors and used as provided.

The preparation of an SWCNT "pre-dispersion" involved mixing while the wax was melted and grinding when the wax was frozen, as described above. SWCNT was thus mixed into wax up to about a 10 weight % loading. Beyond 10% the mixture became a bit friable and stiff. In a first example, SWCNT was mixed into the wax up to about a 10% loading. In a second example, beyond about 12% the mixture became a bit friable and stiff. By adding some petrolatum to the wax, it was found that suitable mixtures could be obtained at SWCNT loadings up to about 17 weight %. The melt/mix/freeze/grind cycle was repeated up to eight times, examining the dispersion quality of the SWCNT optically after each cycle and after the third, sixth and eight cycles using scanning electron microscopy (SEM). It was found that dispersion improved up through the sixth cycle, but after eight cycles there was very little change or further improvement in dispersion. For the following examples, a predispersion of 17% SWCNT, 8% petrolatum, and 75% wax (by weight) was used.

The rubber compounding herein utilized a conventional Brabender lab mixer with 75 ml internal volume. In a first series of rubber compounding examples, shown in Table 1, the base elastomer composition was 100 parts by weight Vistalon 706 (EPM) sold under that trade named by Exxon Chemicals; with 20 parts per hundred parts of elastomer ("phr") of silica (HiSil 190G), and 5 phr of peroxide curative (Vul-Cup 40KE). This composition was mixed as the control example (i.e., with no CNT). For comparative examples for this series, SWCNT was mixed directly into the elastomer composition at loadings of 0.5, 1.25 and 2.5 volume %, respectively. Inventive examples were mixed using the aforementioned pre-dispersion of SWCNT in petrolatum/wax blend again resulting in loadings of 0.5, 1.25 and 2.5 volume %, respectively. Cure studies were run on a standard rubber moving die rheometer ("MDR") at 170° C. (per ASTM D-5289). Tensile tests were carried out at room temperature per ASTM D-412. Reported results include the "10% modulus" which is the stress at 10% strain in N/mm². Tests are at room temperature and in the with-grain direction unless otherwise indicated. The formulations and results are shown in Table 1. It can be seen that mixing the SWCNT directly into the rubber composition results in very little reinforcement, i.e., the 10% modulus increases only slightly from the control for the comparative examples, Comp. Ex. 2-4. On the other hand, the 10% modulus of the inventive examples, Ex. 5-7 increases significantly with loading, indicating that the dispersion using the inventive method is much improved. The 10% modulus of the 2% inventive Ex. 7 is 65% more than that of the 2% Comp. Ex. 4. At the same time, the tensile strength (i.e. peak stress in Table 1) is increasing, so that the strength of Ex. 7 is 34% more than Comp. Ex. 4. Surprisingly, at the same time as the 10% modulus and tensile strength are increasing, the elongation at break is also increasing, which could indicate an increased toughness due to use of the predispersion method. In fact, the energy density for the tensile test indicates a large increase in toughness in that the energy density of Ex. 4 is almost three times that of Comp. Ex. 4. Shore A hardness values were also determined for this series of compounds.

The hardness values track the modulus values seen for these samples and indicate the superior reinforcement for the inventive method.

respectively. The two comparative variables, Comp. Ex. 14-15, had equivalent amounts of wax without CNT added to the compounds to determine the effect of the wax on the

TABLE 1

|  | Comp. Ex. 1 | Comp. Ex. 2 | Comp. Ex. 3 | Comp. Ex. 4 | Ex. 5 | Ex. 6 | Ex. 7 |
|---|---|---|---|---|---|---|---|
| Vistalon 706 | 100 | 100 | 100 | 100 | 100 | 100 | 100 |
| HiSil 190G | 20 | 20 | 20 | 20 | 20 | 20 | 20 |
| CNT | 0 | 1.17 | 2.95 | 4.75 | 0 | 0 | 0 |
| CNT/wax | 0 | 0 | 0 | 0 | 6.07 | 16.46 | 28.36 |
| Vul-Cup 40 KE | 5 | 5 | 5 | 5 | 5 | 5 | 5 |
| CNT vol. % | 0 | 0.5 | 1.25 | 2.0 | 0.5 | 1.25 | 2.0 |
| 10% Modulus (N/mm$^2$) | 0.78 | 0.87 | 0.87 | 0.96 | 0.79 | 1.21 | 1.58 |
| Peak Stress (N/mm$^2$) | 4.32 | 5.69 | 5.85 | 6.98 | 7.82 | 7.08 | 9.32 |
| % Elong. at Break | 314.1 | 377.2 | 397.4 | 442.6 | 659.1 | 811.1 | 974.9 |
| Energy Density (N/m/mm$^3$) | 8.1 | 12.0 | 13.3 | 17.7 | 26.2 | 31.9 | 51.0 |
| Shore A Hardness | 63 | 64 | 66 | 68 | 67 | 72 | 76 |

In a second series of examples, shown in Table 2, the base elastomer composition was a model compound employing carbon black as the primary filler. In this series, the compound more closely reflected a typical power transmission belt compound using 60 phr of carbon black along with other standard ingredients (see Comp. Ex. 8). The formulations used and the results are shown in Table 2 below. The base formulation uses 100 parts by weight Vistalon 706; 60 phr N550 carbon black, 15 phr zinc dimethacrylate (ZDMA), 10 phr of paraffinic oil, 1 phr of antioxidant, 0.3 phr of scorch retarder, and 5 phr of peroxide curative (Vul-Cup 40KE). The other formulations use 50 phr carbon black, thus substituting SWCNT for carbon black. Standard mixing procedures were again used for this series with the wax or SWCNT or blends added in the early first stage. Table 2 also shows some useful calculations of volume percent for comparing the loadings of CNT, carbon black, and/or wax. In this series, the volume percent being evaluated was limited to either 0.5% or 1.25%, as indicated for Ex. 11 and Ex. 13, compound properties. Comp. Ex. 10 and 12 have the same amounts of SWCNT but without the wax preblending step. Comp. Ex. 8 and 9 are controls showing the baseline properties for formulations with carbon black and no CNT or wax. The DeMattia test was carried out in accordance with ASTM D813 with a pierced specimen. The cut growth rate is reported as the extrapolated number of mega-cycles to reach a 1-inch cut width, i.e., Mcycles/in.

The choice of multiple comparative examples in the second study was designed to confirm the elongation at break data that was observed in the first study. It should also be noted that the 0.5 vol % of SWCNT listed for Comp. Ex. 10 is the same SWCNT volume found in Ex. 11 except that it takes eight times the volume of the wax/SWCNT blend to achieve this same 0.5 vol % level of SWCNT in the compound. The same applies when comparing Comp. Ex. 12 and Ex. 13.

TABLE 2

|  | Comp. Ex. 8 | Comp. Ex. 9 | Comp. Ex. 10 | Ex. 11 | Comp. Ex. 12 | Ex. 13 | Comp. Ex. 14 | Comp. Ex. 15 |
|---|---|---|---|---|---|---|---|---|
| EPM | 100 | 100 | 100 | 100 | 100 | 100 | 100 | 100 |
| Carbon Black[1] | 60 | 50 | 50 | 50 | 50 | 50 | 50 | 50 |
| ZDMA Coagent | 15 | 15 | 15 | 15 | 15 | 15 | 15 | 15 |
| Paraffin Oil | 10 | 10 | 10 | 10 | 10 | 10 | 10 | 10 |
| Antioxidant | 1 | 1 | 1 | 1 | 1 | 1 | 1 | 1 |
| Wax blend |  |  |  |  |  |  | 5.55 | 14.66 |
| SWCNT |  |  | 1.53 |  | 3.87 |  |  |  |
| Wax/SWCNT |  |  |  | 7.72 |  | 20.58 |  |  |
| Retarder | 0.3 | 0.3 | 0.3 | 0.3 | 0.3 | 0.3 | 0.3 | 0.3 |
| Peroxide (40 KE) | 5 | 5 | 5 | 5 | 5 | 5 | 5 | 5 |
| Carbon black (vol.%) | 19.0 | 16.35 | 16.27 | 15.72 | 16.14 | 14.71 | 15.77 | 14.92 |
| SWCNT (vol. %) |  |  | 0.5 | 0.5 | 1.25 | 1.25 |  |  |
| SWCNT/wax (vol. %) |  |  |  | 4.0 |  | 10.0 |  |  |
| Wax blend (vol. %) |  |  |  | 3.5 |  | 8.75 | 3.5 | 8.75 |
| 10% Modulus (N/mm$^2$) | 1.38 | 1.17 | 1.32 | 1.40 | 1.47 | 2.09 | 1.23 | 1.72 |
| % Elong. at Break | 331 | 390 | 394 | 431 | 419 | 495 | 308 | 544 |
| Shore A Hardness | 78 | 75 | 77 | 78 | 77 | 82 | 75 | 81 |
| DeMattia 125° C. (Mcycle/in) | 3.99 | 12.68 | 68.48 | 86.75 | 208.8 | 809.5 | 52.81 | 162.5 |
| % Elong 125° C. | 177 | 195 | 182 | 191 | 219 | 270 | 220 | 223 |
| 10% Mod. 125° C. (N/mm$^2$) | 0.83 | 0.77 | 0.74 | 0.66 | 0.81 | 0.55 | 0.58 | 0.48 |

[1]N550

The wax pre-dispersion provides improved dispersion of the SWCNT in an EPDM compound, resulting in improved reinforcement from the SWCNT. Table 2 shows that when 1.25 vol. % of SWCNT is used to replace 10 phr carbon black (N550), the 10% modulus increased 7% when added without the wax pre-dispersion (Comp. Ex. 12 versus Comp. Ex. 8), while it increased 50% when the wax pre-dispersion was used (Ex. 13 versus Comp. Ex. 8). When the 1.25 vol. % of SWCNT were added to 50 phr of N550, the increase in 10% modulus was 26% for SWCNT without wax (Comp. Ex. 12 versus Comp. Ex. 9) and 79% for with wax (Ex. 13 versus Comp. Ex. 9). This shows the considerable advantage of pre-dispersion of the SWCNT in wax. Similar but lesser effects can be detected in the results with only 0.5 vol. % SWCNT predispersed in wax (Ex. 11).

The presence of the paraffin wax resulted in a decrease in modulus at elevated temperatures, as indicated by the 10% modulus at 125° C. for Comp. Ex. 14-15 in Table 2. This is presumed to be the result of melting of the high level of wax in the compound. The addition of the SWCNT at least partially overcomes this effect by increasing the modulus (compare Ex. 11 and 13 to Comp. Ex. 14-15). Other properties at elevated temperatures are also affected by the melting of wax. The effects of wax, once known, can be compensated for in the formulation.

It should be noted that the elongation at break for the compounds increased substantially along with significant improvement in 10% modulus, counter to the trends observed in the literature. For example, the Ex. 13, which showed a 50% increase in 10% modulus, was accompanied by a 50% increase in elongation at break. The wax/SWCNT combination also showed improvements in tear strength, cut growth rates on the DeMattia test and fatigue resistance. It may also be noted that peak stress, compression set and abrasion got slightly worse with wax/SWCNT. Some of these results may be attributable to the softening of the compound from wax, especially when melting at elevated temperatures. However, others, such as the increase in cut growth resistance shown by the DeMattia results in Table 2 are clearly results of the improved dispersion of SWCNT in rubber through use of the wax predispersion. The simultaneous improvement in modulus and elongation is believed attributable to improved dispersion of the CNT in the elastomer composition, which is very difficult to quantify. Therefore, the invention is best characterized by the simultaneous increase in modulus (e.g. 10% modulus) and elongation at break relative to the same composition without CNT. Preferably, the increase in both properties is in the range of at least 25%, or at least 30%, or at least 50%.

It may also be noted that conductivity/resistivity measurements indicated that Ex. 13 and Comp. Ex. 12 had significantly higher conductivity than all the other compositions, enough to be considered static conductive. However, conductivity did not seem to be dependent on the method of dispersing the CNT, just on their presence in sufficient amounts.

Thus the present inventive method of dispersing CNT in elastomers results in improved dispersion over prior art methods, resulting in simultaneously increased modulus and elongation in the resulting elastomer composition. The inventive elastomer compositions may be used to make various rubber articles, for example, belts, hose, vibration control components, tires, sheet goods, and the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method for dispersing carbon nanotubes ("CNT") comprising:
    melt-mixing a blend comprising said CNT and a wax;
    cooling said blend;
    grinding said blend; and
    re-melt-mixing said blend.

2. The method of claim 1 wherein said blend comprises up to 50% CNT by weight based on the total blend weight.

3. The method of claim 1 wherein said CNT are single-wall carbon nanotubes ("SWCNT").

4. The method of claim 1 wherein said CNT is multi-wall carbon nanotube ("MWCNT").

5. The method of claim 1 wherein said blend further includes petrolatum in an amount less than the amount of said wax in the blend.

6. The method of claim 1 wherein said melt-mixing comprises:
    melting said wax;
    combining said CNT with said wax; and
    stirring said blend with said wax thus melted.

7. The method of claim 6 wherein said cooling solidifies said blend sufficient for grinding the blend into particles.

8. The method of claim 1 wherein said re-melt-mixing comprises melting said wax in said blend and stirring said blend.

9. The method of claim 8 wherein the sequence of melting, stirring, cooling and grinding is carried out at least twice on the blend.

10. The method of claim 8 wherein the sequence of melting, stirring, cooling and grinding is carried out at least three times on the blend.

11. The method of claim 8 wherein the sequence of melting, stirring, cooling and grinding is carried out four to six times on the blend.

12. The method of claim 1 further comprising mixing said blend into an elastomeric composition.

13. The method of claim 12 wherein the primary elastomer in the elastomer composition is an ethylene-α-olefin elastomer.

14. The method of claim 12 wherein the ethylene-α-olefin elastomer is EPM, EBM, EOM or EPDM.

15. The method of claim 12 further comprising making a rubber article comprising said elastomeric composition.

16. The method of claim 12 wherein said rubber article is a belt, hose, tire, or vibration control component.

17. An elastomeric composition comprising CNT, a wax and an elastomer;
    wherein the CNT is sufficiently dispersed in the elastomeric composition so that the elastomeric composition exhibits an increased 10% modulus and an increased elongation at break, relative to the same composition without CNT.

18. The composition of claim 17 wherein the amount of CNT is from 0.5 to 5% of the composition by weight.

19. The composition of claim 17 formed into a rubber article.

20. The composition of claim 17 wherein the amount of said increase in each of said 10% modulus and said elongation at break is at least 30%.

21. The composition of claim 20 wherein the rubber article is a belt, tire, vibration control component, or a hose.

* * * * *